United States Patent
Blanco et al.

(10) Patent No.: US 9,361,715 B2
(45) Date of Patent: Jun. 7, 2016

(54) GLOBAL COMPOSITION SYSTEM

(75) Inventors: Leonardo E. Blanco, Redmond, WA (US); Silvana Patricia Moncayo, Seattle, WA (US); Reiner Fink, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 13/152,133

(22) Filed: Jun. 2, 2011

(65) Prior Publication Data

US 2012/0306912 A1    Dec. 6, 2012

(51) Int. Cl.
*G06T 11/60* (2006.01)
*G06T 1/20* (2006.01)
*G06F 3/14* (2006.01)
*G09G 5/14* (2006.01)
*G06F 9/44* (2006.01)

(52) U.S. Cl.
CPC .............. *G06T 11/60* (2013.01); *G06F 3/1454* (2013.01); *G06T 1/20* (2013.01); *G06F 9/4443* (2013.01); *G06T 2201/00* (2013.01); *G06T 2210/21* (2013.01); *G09G 5/14* (2013.01); *G09G 2340/12* (2013.01); *G09G 2358/00* (2013.01); *G09G 2370/022* (2013.01)

(58) Field of Classification Search
CPC ......... G06T 15/005; G06T 1/00; G06T 15/00; G06T 1/20; G09G 5/363
See application file for complete search history.

(56) References Cited

U.S. PATENT DOCUMENTS

| 5,745,095 A | 4/1998 | Parchem et al. |
|---|---|---|
| 6,172,684 B1 | 1/2001 | Lapidous |
| 6,697,063 B1 | 2/2004 | Zhu |
| 6,961,065 B2 | 11/2005 | Sasaki |
| 7,012,606 B2 | 3/2006 | Swedberg et al. |
| 7,133,041 B2 | 11/2006 | Kaufman et al. |
| 7,154,503 B2 | 12/2006 | Yuan |

(Continued)

FOREIGN PATENT DOCUMENTS

| JP | 2007510202 A | 4/2007 |
|---|---|---|
| JP | 2007510976 A | 4/2007 |

(Continued)

OTHER PUBLICATIONS

Humphreys, Greg, et al. "Chromium: a stream-processing framework for interactive rendering on clusters." ACM Transactions on Graphics (TOG). vol. 21. No. 3. ACM, 2002.*

(Continued)

*Primary Examiner* — Maurice L McDowell, Jr.
*Assistant Examiner* — Raffi Isanians
(74) *Attorney, Agent, or Firm* — Timothy Churna; Judy Yee; Micky Minhas

(57) ABSTRACT

A global composition system is described. In one or more implementations, the global composition system may be configured to perform rendering for a plurality of applications. For example, the global composition system may be configured to expose one or more application programming interfaces (APIs) that are accessible to the applications. The APIs may then be used to cause a single composition engine to perform the rendering for the plurality of applications. The use of a single composition engine may be used to support a variety of different functionality, such as to perform efficient rendering by knowing what elements are provided by each of the applications and how those items relate for rendering to a display device.

20 Claims, 6 Drawing Sheets

(56) References Cited

U.S. PATENT DOCUMENTS

| | | | |
|---|---|---|---|
| 7,168,048 B1* | 1/2007 | Goossen et al. | 715/797 |
| 7,443,401 B2 | 10/2008 | Blanco et al. | |
| 7,450,130 B2 | 11/2008 | Swedberg et al. | |
| 7,548,237 B2 | 6/2009 | David et al. | |
| 7,609,280 B2 | 10/2009 | Subramanian et al. | |
| 7,681,143 B2 | 3/2010 | Lindsay et al. | |
| 7,839,410 B1 | 11/2010 | Brown et al. | |
| 7,839,419 B2 | 11/2010 | Hanggie et al. | |
| 7,847,755 B1 | 12/2010 | Hardebeck et al. | |
| 8,248,412 B2 | 8/2012 | Fowler et al. | |
| 2003/0076328 A1 | 4/2003 | Beda et al. | |
| 2003/0078956 A1 | 4/2003 | Ravichandran et al. | |
| 2003/0208744 A1 | 11/2003 | Amir et al. | |
| 2003/0210267 A1 | 11/2003 | Kylberg et al. | |
| 2004/0222992 A1 | 11/2004 | Calkins et al. | |
| 2005/0088436 A1* | 4/2005 | Swedberg et al. | 345/420 |
| 2005/0140692 A1 | 6/2005 | Swedberg et al. | |
| 2005/0219258 A1 | 10/2005 | Stokes et al. | |
| 2006/0050078 A1 | 3/2006 | Monahan | |
| 2006/0061591 A1 | 3/2006 | Anderson | |
| 2006/0195520 A1 | 8/2006 | Stevens et al. | |
| 2007/0013723 A1 | 1/2007 | Souza et al. | |
| 2007/0052723 A1* | 3/2007 | Subramanian et al. | 345/619 |
| 2007/0061733 A1 | 3/2007 | Schechter et al. | |
| 2008/0303835 A1 | 12/2008 | Swift et al. | |
| 2009/0172245 A1* | 7/2009 | Dunstan | 711/101 |
| 2010/0289804 A1 | 11/2010 | Jackman et al. | |
| 2011/0080416 A1 | 4/2011 | Duluk, Jr. et al. | |
| 2013/0063445 A1 | 3/2013 | Blanco et al. | |
| 2013/0063459 A1 | 3/2013 | Schneider et al. | |
| 2013/0063464 A1 | 3/2013 | Schneider et al. | |
| 2013/0063482 A1 | 3/2013 | Moncayo et al. | |
| 2014/0333637 A1 | 11/2014 | Blanco et al. | |
| 2014/0344729 A1 | 11/2014 | Blanco et al. | |
| 2015/0334908 P1 | 11/2015 | Miller | |

FOREIGN PATENT DOCUMENTS

| | | |
|---|---|---|
| JP | 2009507306 A | 2/2009 |
| WO | WO 2005045736 | 5/2005 |
| WO | WO 2007032846 | 3/2007 |
| WO | WO 2011060442 | 5/2011 |
| WO | 2012/166189 A1 | 12/2012 |

OTHER PUBLICATIONS

Piringer, et al., "A Multi-Threading Architecture to Support Interactive Visual Exploration", Retrieved at <<http://www.informatik.uni-rostock.de/~ct/pub_files/Piringer09MultiThreading.pdf>>, IEEE Transactions on Visualization and Computer Graphics, vol. 15, Issue 06, Nov.-Dec. 2009, pp. 8.

Stoyanov, Stanimir, "The Desktop Window Manager API", Retrieved at <<http://www.stoyanoff.info/blog/projects-and-researches/dwm-api-overview/>>, Retrieved Date: Apr. 20, 2011, pp. 3.

"International Search Report", Mailed Date: May 22, 2012, Application No. PCT/US2011/055531, Filed Date: Oct. 9, 2011, pp. 10.

"Architecture and Components", Retrieved from <http://msdn.microsoft.com/en-us/library/windows/desktop/hh43750(v=vs.85).aspx> on Apr. 11, 2013, (Nov. 28, 2012), 6 pages.

"Basic Concepts", Retrieved from <http://msdn.microsoft.com/en-us/library/windows/desktop/hh43751(v=vs.85).aspx>, (Nov. 28, 2012),10 pages.

"DCompositionCreateSurfaceHandle Function", Retrieved from <http://msdn.microsoft.com/en-us/library/windows/desktop/hh437360(v=vs.85).aspx> Apr. 11, 2013, (Nov. 28, 2012), 3 pages.

"Resource Manager Class", Retrieved from <http://msdn.microsoft.com/en-us/library/system.resources.resourcemanager.aspx> on Apr. 12, 2013, (2013), 28 pages.

"Why Use DirectComposition?", Retrieved from <http://msdn.microsoft.com/en-us/library/windows/desktop/hh449195(v=vs.85).aspx> on Apr. 11, 2013, (Nov. 28, 2012), 2 pages.

"WPF Graphics Rendering Overview", Retrieved from <http://msdn.microsoft.com/en-us/library/ms748373.aspx> on Apr. 11, 2013, (2013), 20 pages.

Boudon, et al., "A Survey of Computer Representations of Trees for Realistic and Efficient Rendering", *Technical Report 2301, LIRIS, No. 2301-2006*, Available at <http://liris.cnrs.fr/Documents/Liris-2301.pdf>, (Feb. 2006), 20 pages.

Kobbelt, et al., "A Survey of Point-Based Techniques in Computer Graphics", *Computers and Graphics, vol. 28, No. 6*, (Jul. 12, 2004), 23 pages.

Tonouchi, et al., "Creating Visual Objects by Direct Manipulation", *In IEEE International Workshop on Visual Languages*, Available at <http://pdf.aminer.org/000/641/485/creating_visual_objects_by_direct_manipulation.pdf>, (Sep. 15, 1992), 7 pages.

"International Search Report & Written Opinion for PCT Patent Application No. PCT/US2013/060775", Mailed Date: Jan. 9, 2014, Filed Date: Sep. 20, 2013, 8 Pages.

"Extended European Search Report", EP Application No. 11866466.3, Jan. 8, 2015, 13 pages.

"Non-Final Office Action"U.S. Appl. No. 13/895,239, Jan. 20, 2015, 28 pages.

Translated Japanese Office Action mailed Sep. 29, 2015 for Japanese Patent Application 2014-513493, a counterpart foreign application of U.S. Appl. No. 13/152,133, 10 pages.

".NET Framework version history—Wikepedia the free encyclopedia", Retrieved at: http://en.wikipedia.org/wiki/.NET_Framework_version_history, Mar. 24, 2015, 11 pages.

"Windows Presentation Foundation—Wikipedia, the free encyclopedia", Retrieved at: http://en.wikipedia.org/wiki/Windows_Presentation_Foundation, May 12, 2013, 12 pages.

"International Search Report and Written Opinion", Application No. PCT/US2013/060776, Apr. 2, 2015, 16 Pages.

"Shapes and Basic Drawing in WPF Overview", Retrieved at: https://msdn.microsoft.com/en-us/library/ms747393%28v=vs.110%29.aspx, Aug. 15, 2012, 8 pages.

"Painting with Solid Colors and Gradients Overview", Retrieved at: https://msdn.microsoft.com/en-us/library/ms754083%28v=vs.110%29.aspx, Aug. 15, 2012, 9 pages.

"Final Office Action", U.S. Appl. No. 13/895,239, Jun. 19, 2015, 26 pages.

"Non-Final Office Action", U.S. Appl. No. 13/891,598, Jun. 29, 2015, 16 pages.

"Second Written Opinion Issued in PCT Application No. PCT/US2014/063616", Mailed Date: Sep. 29, 2015, 4 Pages.

\* cited by examiner

GLOBAL COMPOSITION SYSTEM

BACKGROUND

A wide variety of elements may be rendered on a computing device, such as icons, windows, animations, and so on. Further, the numbers of applications typically executed on the computing device continues to increase as well as the number of elements each of the applications typically provides, such as to provide additional functionality and a richer user experience.

However, this increase in elements may consume a significant amount of resources of the computing device, such as processor, memory, graphics hardware, and other resources. Further, this consumption may also have an effect on execution of the applications themselves.

SUMMARY

A global composition system is described. In one or more implementations, the global composition system may be configured to perform rendering for a plurality of applications. For example, the global composition system may be configured to expose one or more application programming interfaces (APIs) that are accessible to the applications. The APIs may then be used to cause a single composition engine to perform the rendering for the plurality of applications. The use of a single composition engine may be used to perform efficient rendering by knowing what elements are provided by each of the applications and how those items relate for rendering to a display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques used to render elements by a computing device employed a distributed system in which each application was assigned a corresponding composition engine. Because of this, the different composition engines were unaware of what was being performed by other composition engines. This could lead to redundancies, unnecessary rending of elements, and so on that could hinder the efficiency of a computing device that implemented the conventional techniques and thus could make these conventional techniques ill suited for use by "thin" computing devices.

Global composition techniques are described herein. In one or more windows, a single composition engine is accessible by a plurality of different applications via one or more APIs. Thus, the composition engine may be made "aware" of what is being contributed by the various applications and how those elements relate. This knowledge may then be leveraged to improve efficiency in the rendering of elements of the applications. In one or more implementations, the composition engine runs asynchronous from threads belonging to those applications, which allows applications to cause content to be animated within their windows and use disparate rendering technologies to rasterize such content. Additionally, composition data from each application in the system may be managed in a single graph (e.g., a global composition tree) which allows the composition engine to perform global optimizations such as occlusion detection, as well as to mix and match content from multiple applications in an efficient and secure fashion. Further discussion of these and other techniques may be found in relation to the following figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
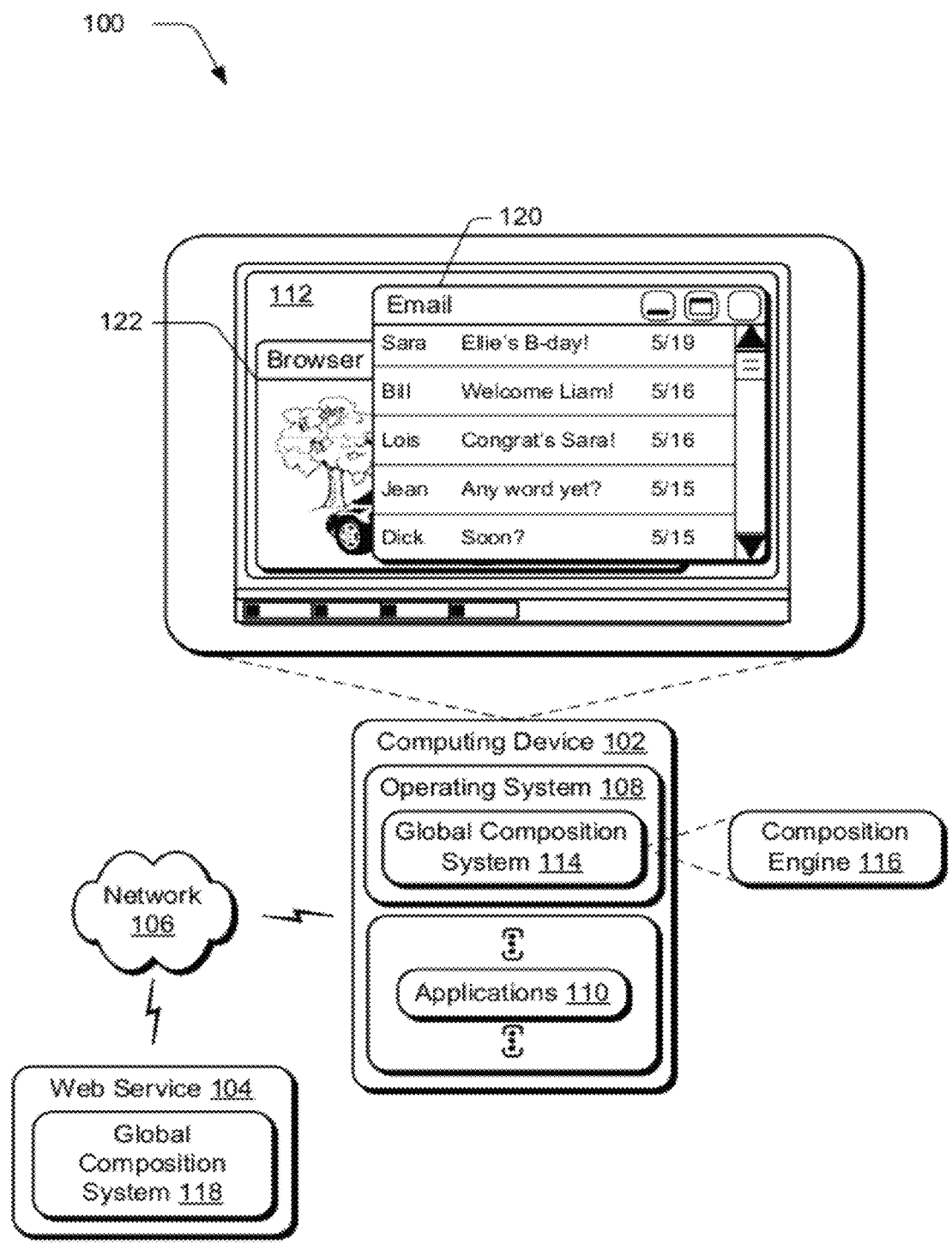
FIG. 1 is an illustration of an environment in an example implementation that is operable to implement a global composition system.

FIG. 1 is an illustration of an environment 100 in an example implementation that is operable to employ techniques described herein. The illustrated environment 100 includes a computing device 102 that is communicatively coupled to a web service 104 via a network 106. The computing device 102 as well as computing devices that may implement the web service 104 may be configured in a variety of ways.

For example, a computing device may be configured as a computer that is capable of communicating over the network 106, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by the web service 104, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 102 is further illustrated as including an operating system 108. The operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device 112 without understanding how this rendering will be performed.

The operating system 108 may also represent a variety of other functionality, such as to manage a file system and user interface that is navigable by a user of the computing device 102. An example of this is illustrated as a desktop that is displayed on the display device 112 of the computing device 102.

The operating system 108 is also illustrated as including a global composition system 114. The global composition system 114 may represent a system that includes a direct composition component that is configured to allow applications 110 to use a single global composition engine 116 (hereinafter also referred to simply as composition engine 116) to draw items on the display device 112. Although illustrated as part of an operating system 108, the global composition system 114 may be implemented in a variety of other ways, such as part of a browser, as a stand-alone module, and so forth. Further, the global composition system 114 may be distributed across the network 106, an example of which is illustrated as inclusion of a global composition system 118 on the web service 104.

User experiences (e.g., user interfaces generated for applications 110) may include a signification number of elements that may interact with each other, such as windows, animations (e.g., text scrolling), and so on. For example, a first window may correspond to an email application and a second window 122 may correspond to a browser as illustrated on the display device 112. Thus, a multitude of different rendering components may be involved at any one particular point in time. Further, these different elements may have different refresh rates, such as an animation of a "ticker" display along with video and static text.

The global composition system 114 may be utilized to abstract this functionality such that different applications 110 may offload this rendering and thus be unaware of how the rendering is performed. For example, applications 110 may provide data that describe elements to be rendered, placement of the elements, and how the elements interrelate with each other.

Additionally, the global composition system 114 may support "independent" animation. An application 110, for instance, may communicate a declaration description of an animation that describes how an animation is to be rendered. For example, the description may describe what is being animated, a rate at which redraws are to occur, a location at which the animation is to begin, a curve over which the animation is to move, an ending location of the animation, an amount of time the animation is to be rendered, and so forth.

This rendering may then be performed by the global composition system 114 and continue without further instruction. In this way, the rendering of the animation is independent of the caller (e.g., the application 110), such that loss of communication with the application 110, inconsistent processing of the application 110, and so on does not have an effect on the rendering of the animation. Thereby, this may be used to improve "smoothness" and "fluidity" of the animation as well as resources of the computing device 102 (and even network 106 are further described below) by cutting down on the number of communications by the application 110 to render the animation.

Conventionally, each of the applications 110 that were executed by a computing device 102 interacted with a corresponding composition engine to perform the processing and rendering of a display for the respective application. Therefore, conventional composition engines were often implemented "per process." Accordingly, conventional techniques may involve execution of a plurality of different composition engines at any one time. Additionally, conventional composition engines were typically "not aware" of the rendering performed by other composition engines. This could result in inefficient use of resources of the computing device 102, such as to draw a window even though it may be occluded by another window which could result in unnecessary use of processor, graphical processor, memory, and other resources of the computing device 102.

In one or more implementations, the global composition system 114 follows a global architecture such that a plurality of applications 110 may access the composition engine 116, e.g., via an application programming interface. For example, a single composition engine 116 may be responsible for an entire desktop and elements from applications 110 that are currently being executed. Thus, the single composition engine 116 may be "aware" of the different elements that are to be rendered for the plurality of applications and react accordingly.

Continuing with the previous example, the composition engine 116 may be aware that an element of an application (e.g., a window) is to be occluded by an element to be rendered for another application, e.g., another window. As shown in FIG. 1, for instance, the application may have a window that is to be displayed behind the window 120 that corresponds to the email application. Previously, even though the corresponding window of the application was not viewable to a user of the computing device 102, the window was still rendered. However, the composition engine 116 may use the present techniques to skip the rendering of the occluded window, thereby conserving resources of the computing device 102.

The global composition system 114 may be used to provide a wide variety of functionality. As previously described, the global composition system 114 may perform global analysis of what is to be rendered by the plurality of applications and efficiently determine which of the elements are to be drawn, such as in the case of occlusion in which rendering of elements may be skipped as previously described. Additionally, resources may be pooled by the global composition system 114, such as to share intermediate memory by a plurality of applications 110 instead of fragmented memory as could be consumed by conventional composition engines both by the engines themselves as well as what is being drawn by the engines.

The global composition system 114 may also support security techniques. For example, the global composition system 114 may be employed to draw protected video, such as encrypted movies and corresponding licensing. For conventional composition engines, the application composes the content and then transfers the content to a corresponding composition engine. This may result in the content being "transferred in the clear" (e.g., transfer of uncompressed video frames) without the protections and thus the content could be exposed to malicious parties.

However, in one or more implementations described herein the content may be provided to the global composition system 114 and may be executed within a protected area that is not touchable directly by the applications 110. Thus, trust of the composition engine 116 to not further communicate the content may be used to protect that content. For instance, the composition engine may be relied upon to generate pixels for rendering without exposing those pixels to applications that are executed by the computing device 102. Thus, this "one way flow" may help ensure that the wrong application (e.g., from a malicious entity) does not receive the unprotected content.

Further, conventional composition engines and corresponding applications "owned" a particular portion of a screen of a display device 112. Therefore, some display techniques were difficult to support using these conventional techniques. One such technique was transparency for multiple applications because the area of the display device 112 could be owned by one or the other conventional composition engines, but not both. For instance, a particular area of the display device 112 may involve windows from at least two different applications and their corresponding conventional composition engines. Conventionally, to support techniques such as transparency each instance of the windows was drawn to memory and then effects were applied to the combination, which was resource intensive.

However, because the global composition system 114 may be aware of the different windows and react accordingly, the desired result may be achieved without drawing the windows separately to memory beforehand and then applying the visual effects to the windows. For example, the global composition system 114 may utilize a single hierarchical tree that describes elements to be rendered and thus "know" how the elements relate. Therefore, the global composition system 114 may draw directly to memory of the computing device 102 without the intermediate steps that were performed using conventional techniques. Thus, these techniques may be employed by "thin" computing devices that could not employ conventional composition engines due to memory and/or processing limitations.

Additionally, conventional composition engines were generally executed asynchronously to support different rendering rates by different applications. Although this did support functionality such that rendering specified an application associated with one composition did not affect the rendering specified by another application, this could result in an inefficient use of computing device 102 resources.

Further, priorities assigned to the different conventional composition engines may cause errors both to the conventional composition engine as well as associated application. For instance, conventional composition engines may be given a relatively high priority for execution by a processor of the computing device 102. However, instances may occur in which the composition engines consume a signification amount of the resources, such as to support multiple animations. Because of this, the composition engines as well as the applications themselves may not have sufficient resources available to execute as intended when confronted with such resource intensive tasks.

In one or more implementations, the composition engine 116 may be assigned a high priority, e.g., a high thread priority may be assigned to the composition engine 116 relative to priorities assigned to other threads executed by the computing device 102. The global composition system 114 may then mange priority of how elements from the different sources are rendered by the composition engine 116, which is given a high priority to ensure that the rendering occurs. For example, the global composition system 114 may manage which elements are updated, a frequency at which this update occurs (e.g., to switch from 60 Hz to 30 Hz), and so on. Thus, the global composition system 114 may help promote availability of resources of the computing device 102 for other uses, such as the applications 110 that provide the elements for rendering.

Figure 2:
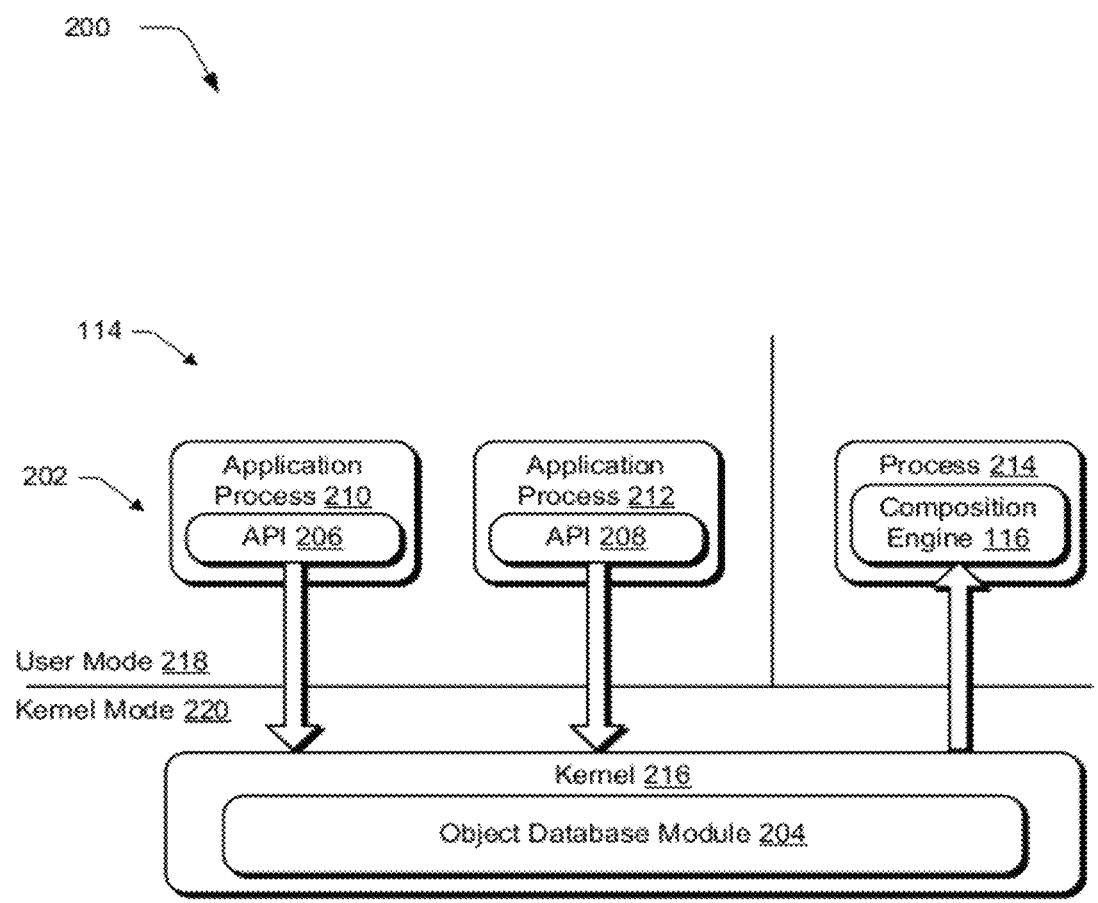
FIG. 2 illustrates an example system in which the global composition system is illustrated in greater detail as including a composition engine of FIG. 1 as well as a user-mode library and object database module.

FIG. 2 illustrates an example system 200 in which the global composition system 114 is illustrated in greater detail as including the composition engine 116 of FIG. 1 as well as a user-mode library 202 and an object database module 204. The user-mode library 202 supports a variety of APIs 206, 208 that are illustrated as being used by respective application processes 210, 212 to interact with the object database module 204. The composition engine 116 is illustrated in this example system 200 as being executed within its own process 214.

Conventional use of a plurality of distributed composition engines protected execution of the engines as well as applications of a computing device from each other. For example, if a first application fails, a first conventional composition engine coupled to the first application may also fail. However, a second composition engine that was coupled to a different conventional composition engine was protected by the failure due to the lack of "knowledge" that the conventional composition engines had of each other.

In one or more implementations, the global composition system 114 may employ techniques to protect against corruption of state of the composition engine 116 by applications 110 that provide elements for rendering. One such technique is to employ the composition engine 116 within a kernel 216 of the operating system 108. Thus, the composition engine 116 may "trust" other components that are also executed in the kernel 216.

In this way, the global composition system 114 may employ a "trust boundary" between a user mode 218 and a kernel mode 220 such that checks are performed by the kernel. In one or more implementations, applications may be relied upon to determine "correctness" provided by the applications such as parameter checking to improve efficiency of processing done by the global composition system 114.

Another such technique involves tracking such that the global composition system 114 "knows" which data (e.g., elements for rendering) belongs to which application. Therefore, a failure of one application (e.g., a crash) does not affect the elements of another application. Further, the global composition system 114 may "clean up" the elements in case of such failure, such as to remove the elements from being rendered after a predetermined amount of time. In this way, the global composition system 114 may allow an application to fail gracefully and not affect other applications and corresponding elements to be rendered.

As illustrated the composition engine 116 is executed on a dedicated system process 214, which is different than processes used to execute other code such as other application processes 210, 212 of the computing device 102. Additionally, this process 214 may be assigned high levels of trust and priority. This process 214, for instance, may be trusted from a point of view of getting composition data and thus may be used for protected data, such as protected video data, email protected with rights management, and so on.

As illustrated in FIG. 2, the global composition system 114 may be implemented using three parts. A first part is illustrated as the composition engine 116, which is representative of functionality to perform the rendering, i.e., "do the drawing" to the display device 112. A second part is illustrated as a user-mode library 202, which is representative of an entity that is called by the applications by exposing application programming interfaces (API) 206, 208. For example, the user-mode library 202 may act as a "mail slot" to receive composition data from the applications, such as through use of a dynamic linked library (DLL).

A third part is illustrated as an object database module 204 that is illustrated as residing in the kernel 216. The object database module 204 is representative of functionality that is responsible for moving data between the user-mode library 202 and the composition engine 116.

The object database module 204 may also perform validation. For example, an application may call the user-mode library 202 to create an element, such as a bitmap. If the requested element does not meet criteria that are enforced by the object database module 204 (e.g., less than "N" number of pixels), the object database module 204 may return a failure message to the application that called the user-mode library 202. Thus, the object database module 204 may operate within the kernel 216 to control what is provided to the composition engine 116. A variety of other policies may be enforced by the object database module 204.

Therefore, the composition engine 116 may rely on data that is provided by the object database module 204 as complying with policies implemented by the object database module 204. In other words, the composition engine may assume that the data is valid and correct and thus suitable for rendering. Consequently, the validation may be performed a single time by the object database module 204 and then utilized by the composition engine 116 to perform the rendering without further validation.

Figure 3:
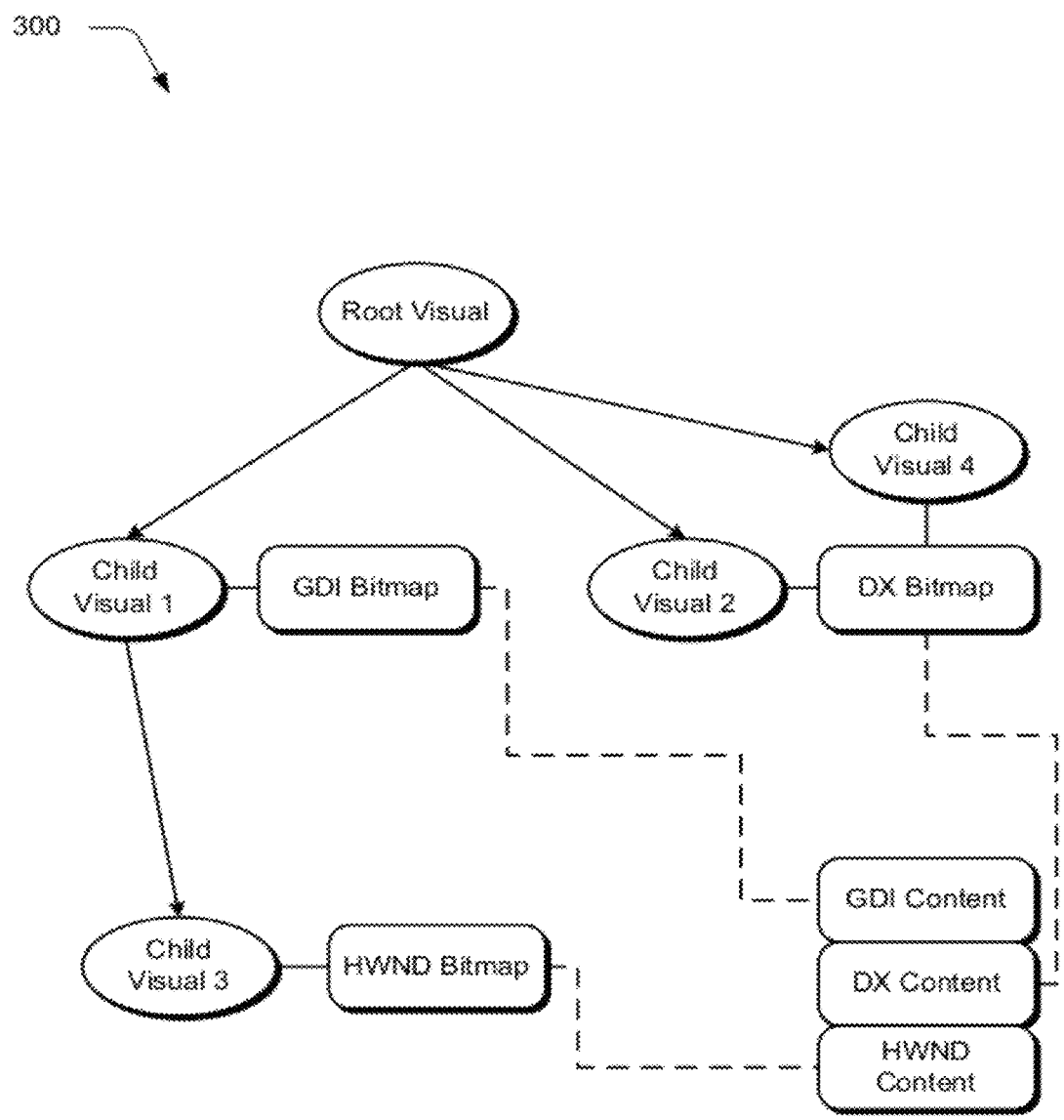
FIG. 3 depicts an example of a graph configured as a global composition tree that is consumable by a composition engine to render elements.

The object database module 204 may also be representative of functionality to inform the composition engine 116 of when data to be rendered has changed. For example, an API implemented via the user-mode library may be configured to consume a graph that describes what is to be rendered, an example of which is shown in FIG. 3. The graph 300 may include a list of elements to be rendered as well as a description of where to render the elements on the display device 112, which may include how the elements are to move in an instance of an animation.

Additionally, the elements to be rendered may be formed using sub-elements and thus the graph 300 may assume a hierarchical structure. Further, the graph 300 may describe how the elements are to be rendered, e.g., draw text once, render an animation, and so forth. Thus, the graph 300 may describe the elements and how the elements relate to each other.

The graph 300 represents two sets of objects that may be used by the composition engine 116 to render a scene, bitmaps that are composed together and visuals that define the spatial relationships according to which those bitmaps are composed. In this model, the bitmaps are the "what" and the visuals are the "how" of the composition engine 116. Those objects are arranged in a tree structure and bound to a top-level or child window for composition. In this figure, a child visual 4 is also illustrated as pointing to the DX bitmap. This describes functionality of the composition system that allows developers to use the same content for multiple UI elements, which may helps conserve resources of the computing device 102, e.g., memory.

Returning again to FIG. 2, once received by the composition engine 116, the application does not need to further call the composition engine 116 to keep rendering the elements. Thus, the composition engine 116 may conserve resources as compared to conventional techniques that could involve an application making sixty calls per second to render an animation at a refresh rate of the display device 112. Thus, the application 110 may call an API of the user-mode library 202 to construct a structure and an API to construct elements to be rendered by the composition engine.

In order to make a change to the content that is rendered by the composition engine 116, the application may call another application programming interface of the user-mode library 202 to update the structure and/or elements. For example, the application may provide data via an update API to provide information to be used for a stock ticker animation.

In one or more implementations, batching techniques may also be leveraged to define which elements are to be rendered using frames. As previously described, the global composition system 114 may receive a variety of different elements for rendering at a variety of different rates. Accordingly, the global composition system 114 may support a structure in which a list of elements to be rendered together is formed. Thus, the global composition system 114 may implement a definition of begin and end for the elements in which the elements received in between are not rendered until the "end" is received. Thus, the frame may support an "all or nothing" approach to the rendering of elements for particular frames and ensure that the elements are rendered together for display when desired.

For example, the object database module 204 may track two different states for an application. The first state may reference elements that are for current display. The second state may reference elements that are to be displayed subsequent to the first state and that are changed. Thus, the second state may be used to build a list of elements for rendering by the composition engine 116 once the list is completed, e.g., once an indication is received from the application that the list is complete.

Once complete, the changes may be sent to the composition engine 116. Further, the timing of the receipt of the indication from the application that the list is complete may be used to determine when those changes are displayed, e.g., which frame. Thus, the composition engine 116 may receive a batch of changes described in one or more lists that are completed but lists that have not been indicated as complete are not communicated. This batching may thus define frames that are rendered by the composition engine 116. Further, this may help limit display of erroneous visual artifacts as could occur using conventional techniques that did not support such a definition. As should be readily apparent, an amount of time that corresponds to the frames may be set for a variety of different amounts as desired.

Thus, the object database module 204 may remember what was previously rendered by the composition engine 116 (e.g., elements and properties of those elements), as well as know what is going to be rendered. Therefore, the object database module 204 may determine which elements are changed by comparing this information. Accordingly, the object database module 204 may communicate information which describes this change without communicating information that is not changed to the composition engine 116.

Additionally, the use of frames may further improve efficiency. For example, an application may communicate data that describes that an object is to be moved a certain distance and return back to an original position. The object database module 204 may determine that this movement is to occur within a time period of a single frame. Accordingly, the object database module 204 may refrain from communicating this data to the composition engine 116 and rather have the object remain at its previous state. For instance, this movement may occur within a time period used to refresh a display device 112 and thus would not be viewable by a user, regardless.

In this way, the object database module 204 may discard intermediate states in the construction of the list that is to be provided to the composition engine 116 for rendering. This list may then be communicated in a variety of ways, such as an array of commands to be performed by the composition engine 116 to implement the changes. Further, this technique may also be used to address instances of unbounded data sent by application because a single instance is reported to the composition engine.

The object database module 204 and the composition engine 116 may also employ acknowledgement techniques that describe that a change was implemented. For example, the composition engine 116 may receive a communication from the object database module 204 that describes a change to be made. While the change is being made, the object database module 204 may wait to send additional changes until an acknowledgement has been received that the previous change was made. Once the acknowledgment is received by the object database module 204, the additional changes may then be communicated to the composition engine.

Further, this technique may be used to provide "throttling" and thus further conserve resources of the computing device 102. For example, an application may make a number of requests that exceed the rate at which a display device is refreshed. By using the frames and batching the changes, the amount of resources that would otherwise be consumed is reduced.

Applications that make changes to what is displayed by calling the API of the user-mode library 202 may be multi-threaded. Accordingly, in one or more implementations the object database module 204 may employ techniques such that multiple calls from the multiple threads of a single application do not corrupt the state. This may be performed by the application locking its threads together, itself, e.g., one thread may be blocked while another thread of the application completes a task.

The changes from the multiple threads may then be stored in a queue which may be managed by the operating system 108, such as through interlocked access that may be employed for variables such that different threads may make "complete" changes before passing control to another thread. This may support the frame techniques described above to arrive at atomic units of work that are to be processed by the composition engine. Additionally, for frames in which updates are not received, execution of the composition engine may be paused until the next frame thereby further conserving resources of the computing device 102.

The kernel 216 may also add a variety of functionality in conjunction with the global composition system 114. For example, when an application fails (e.g., crashes) the kernel 216 may inform the composition engine 116 of this occurrence. The composition engine 116 may then perform techniques that are similar to those that would be used if the application ceased execution "naturally" through a normal exit procedure. In this way, the composition engine 116 may arrive to a "clean up" state such that the elements that correspond to the application are removed from display on the display device 112 of the computing device 102. Thus, this promotes robustness in the execution of the composition engine 116.

The execution of the composition engine 116 may also be secured by implementing a write-only API for the user-mode library 202. In this way, the composition engine 116 may generate the pixels but not expose those pixels back to the applications, thereby protecting the images from malicious parties.

As previously described, implementation of these techniques may also involve devices "outside" of the computing device 102, which may be distributed across one or more entities such as the web service 104. For example, these techniques may be employed to support terminal services, a remote desktop environment, and so on through communication of the batch of elements and properties (e.g., a composition tree such as a graph 300 of FIG. 3) via the network 106. Thus, the graph 300 may be generated elsewhere (e.g., through implementation of the user-mode library 202 and/or the object database module 204 on the web service 104) and transfer the composition tree for rendering by the composition engine 116 through execution of the computing device 102. In this way, the animations may be smoothly displayed even in instances in which the network 106 is unreliable. Further discussion of these and other techniques may be found in relation to the following procedures.

The global composition system 114 may also be configured to take advantage of functionality available from hardware (e.g., a graphics card) to perform operations, which means operations can be made faster and show better performance. Examples of which include use of a graphics processing unit (GPU) to add transparency to a composition element (e.g., piece of UI, entire window), by blending two overlaying semitransparent windows, drawing geometric clips (rounded corners), and so on. When the hardware (e.g., GPU) is not available, the global composition system 114 may still perform these operations by "falling back" to software rendering.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Procedures

The following discussion describes global composition system techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the order shown for performing the operations by the respective blocks. In portions of the following discussion, reference will be made to the environment 100 of FIG. 1, the system 200 of FIG. 2, and the graph 300 of FIG. 3.

Figure 4:
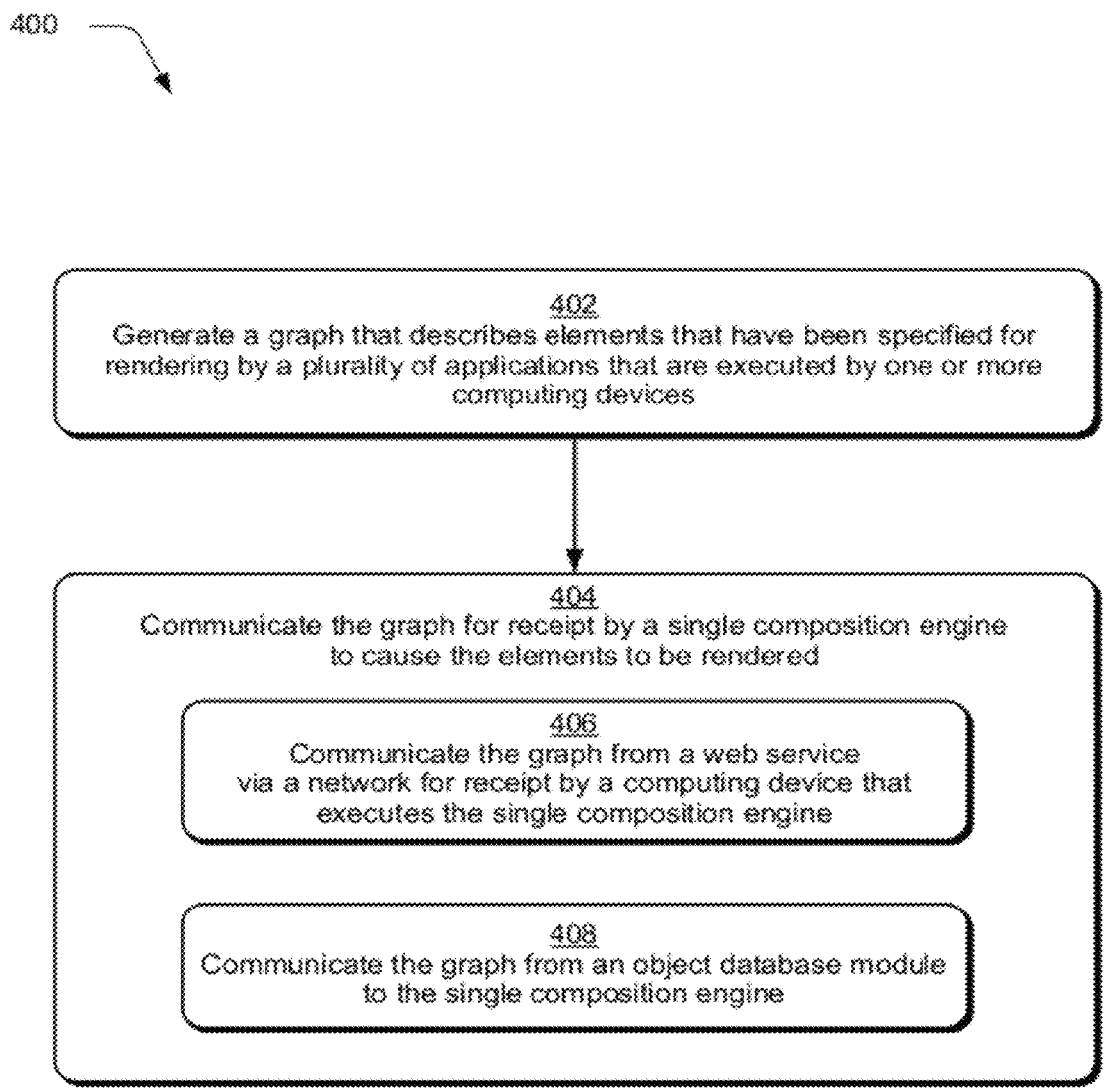
FIG. 4 is a flow diagram depicting a procedure in an example implementation in which a graph is generated that describes elements for rendering by a single composition engine.

FIG. 4 depicts a procedure 400 in an example implementation in which a graph is generated that describes elements for rendering by a single composition engine. A graph is generated that describes elements that have been specified for rendering by a plurality of applications that are executed by one or more computing devices (block 402). As shown in FIG. 3, the graph 300 may include a list of elements to be rendered as well as a description of where to render the elements on the display device 112, which may include how the elements are to move in an instance of an animation. Additionally, the elements to be rendered may be formed using sub-elements and thus the graph 300 may assume a hierarchical structure. Further, the graph 300 may describe how the elements are to be rendered. Thus, the graph 300 may describe the elements and how the elements relate to each other. A variety of other graphs are also contemplated.

The graph is communicated for receipt by a single composition engine to cause the elements to be rendered (block 404). This may be performed in a variety of ways. For example, the graph may be communicated from a web service via a network for receipt by a computing device that executes the single composition engine (block 406), such as from the global composition system 118 of the web service 104 via the network 106 to the composition engine 116 of the computing device 102. In another example, the graph may be communicated from an object database module to the single composition engine (block 408). The object database module 204, for instance, may generate the graph based on data received from the plurality of applications and communicate the graph to the composition engine to reference elements that are updated. A variety of other examples are also contemplated.

Example System and Device

Figure 5:
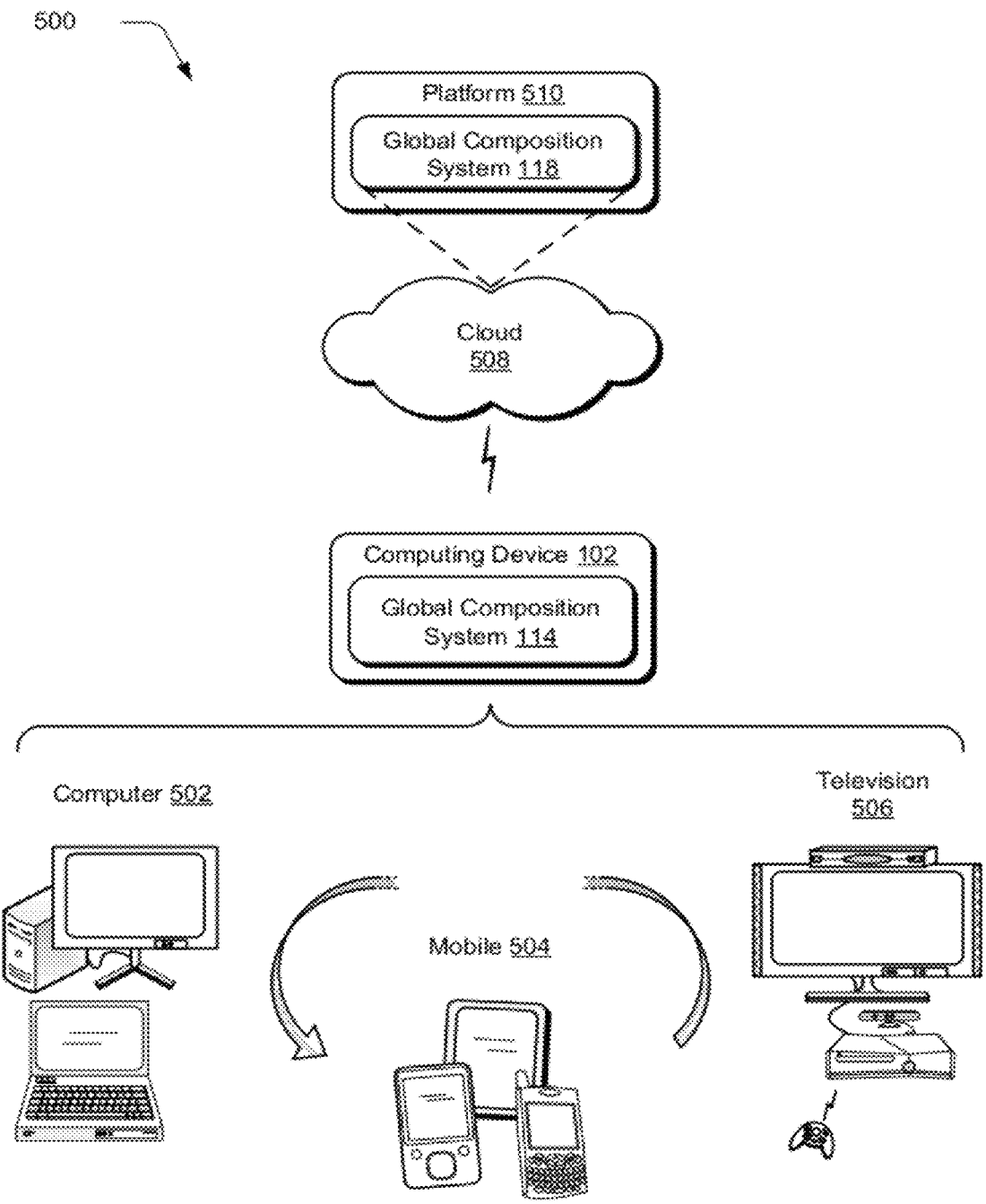
FIG. 5 illustrates an example system that includes the computing device as described with reference to FIG. 1.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on. In the illustrated instance, the computing device 102 is illustrated as implementing at least part of the global composition system 114 described above.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 502 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 508 includes and/or is representative of a platform 510 for content services 512. The platform 510 abstracts underlying functionality of hardware (e.g., servers) and software resources of the cloud 508. The platform is illustrated as supporting at least part of a global composition system 118, such as the user-mode library and/or object database module 204. Thus, the platform may help support remote processing of all or a portion of a global composition system 118.

The platform 510 may abstract resources and functions to connect the computing device 102 with other computing devices. The platform 510 may also serve to abstract scaling of resources to provide a corresponding level of scale to encountered demand for the global composition system 118 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508.

Figure 6:
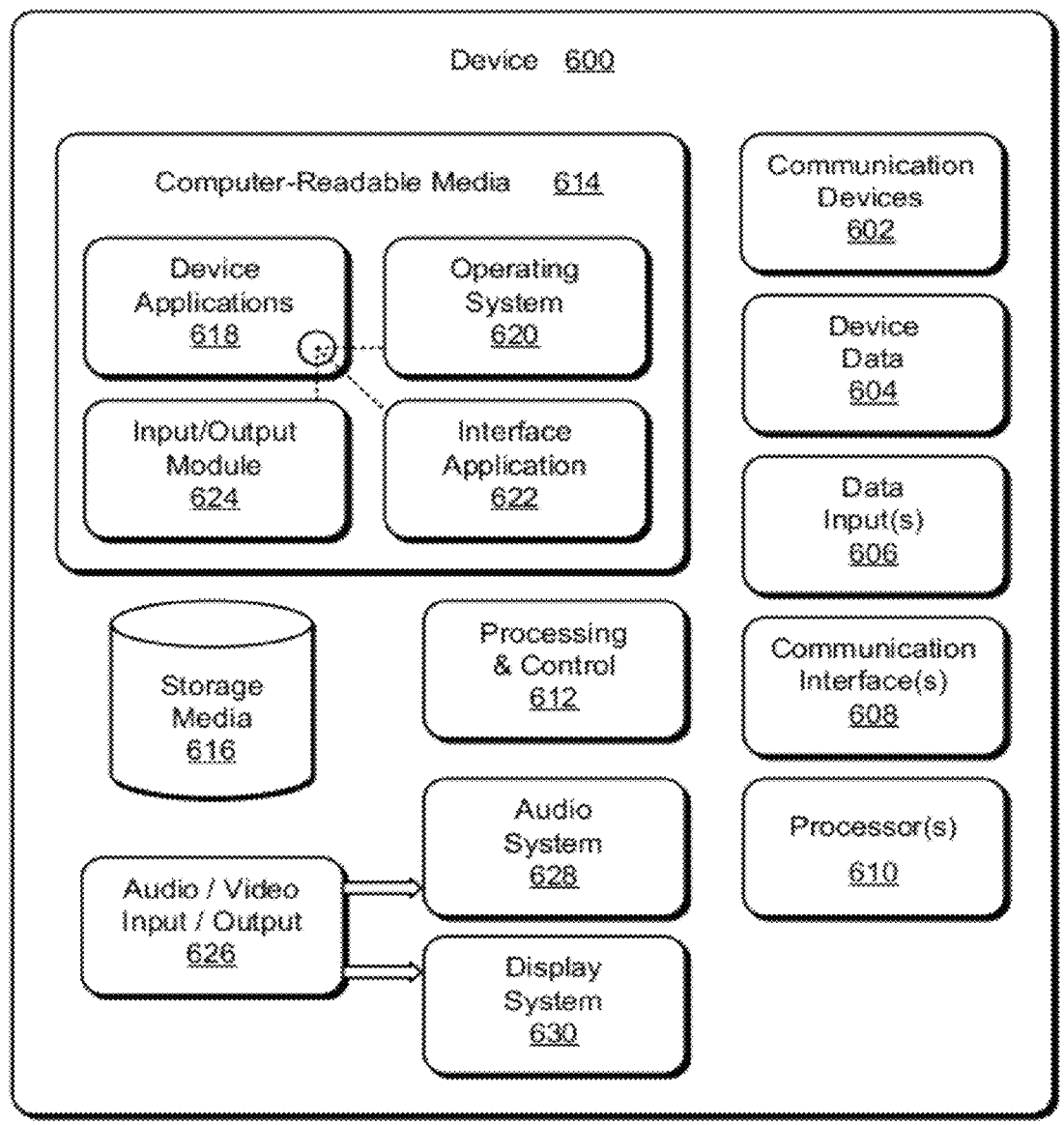
FIG. 6 illustrates various components of an example device that can be implemented as any type of computing device as described with reference to FIGS. 1, 2, and 5 to implement embodiments of the techniques described herein.

FIG. 6 illustrates various components of an example device 600 that can be implemented as any type of computing device as described with reference to FIGS. 1, 2, and 5 to implement embodiments of the techniques described herein. Device 600 includes communication devices 602 that enable wired and/or or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the techniques described herein. In this example, the device applications 618 include an interface application 622 and an input/output module 624 that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising one or more modules at least partially implemented in hardware, the one or more modules configured to implement a single composition engine that is accessible via a single instance of one or more application programming interfaces (APIs) to a plurality of applications, the composition engine programmed to receive data that describes elements from each of the plurality of applications to be rendered by the composition engine for display on a display device, the plurality of applications including at least a first application different from a second application.

2. A system as described in claim 1, wherein the elements include a first window that corresponds to a first said application and a second window that corresponds to a second said application.

3. A system as described in claim 1, wherein a first said element is provided by a first said application and a second said element is provided by a second said application.

4. A system as described in claim 3, wherein the one or more modules are configured to:
determine whether the first said element when rendered would be occluded by the second said element; and
responsive to the determination that the first said element would be occluded, skip rendering of the first said element.

5. A system as described in claim 3, wherein the one or more modules are configured to:
determine that the first said element when rendered would share a same location on a display device as the second said element; and
responsive to the determination, apply one or more visual effects to create a result such that the first and second said elements share the same location without rendering the first and second said elements separately before the application of the one or more visual effects and after the determination.

6. A system as described in claim 1, wherein the one or more modules are further configured to implement an object database module in a kernel of a computing device that includes the one or more modules, the object database module configured to communicate at least a portion of the data from the one or more APIs to the composition engine.

7. A system as described in claim 6, wherein the at least the portion of the data describes a beginning and end of a list of said elements and the object database module is configured to provide the list of said elements to the composition engine responsive to receipt of an indication of the end of the list from a corresponding said application.

8. A system as described in claim 6, wherein the object database module is configured to track which of the elements correspond to which of the plurality of applications.

9. A system as described in claim 6, wherein the object database module is configured to perform validation that the data meets criteria for rendering by the composition engine.

10. A system as described in claim 6, wherein the object database module is configured to communicate the at least the portion of the data that describes elements that have been changed to the composition engine and not communicate another portion of the data that describes elements that have not been changed.

11. A system as described in claim 1, wherein the one or more modules are implemented at least in part through execution of an operating system.

12. A system as described in claim 1, wherein the one or more APIs that receive the data are configured for write-only access by the plurality of applications.

13. A system as described in claim 1, wherein the composition engine is programmed to:
generate pixels that describe the elements; and
not expose the pixels to the plurality of applications.

14. A system as described in claim 1, wherein:
the composition engine is executed alone in a process of a computing device that implements the one or more modules and the process;
the process is assigned a high priority relative to at least one other process of the computing device; and
the composition engine is configured to manage a priority of rendering of the elements within the process.

15. A system as described in claim 1, wherein the data describes an animation and the composition engine is configured to generate the animation without further data from a corresponding said application that provided the data.

16. A method implemented by one or more computing devices, the method comprising:
generating a graph that describes elements that have been specified for rendering by a plurality of applications that are executed by the one or more computing devices, the plurality of applications including at least a first application different from a second application;
communicating the graph for receipt by a single composition engine; and
rendering the elements by the single composition engine of a computing device of the one or more computing devices through execution of the single composition engine on the computing device.

17. A method as described in claim 16, wherein the generating and the communicating are performed by the one or more computing devices that implement at least part of a web service.

18. One or more computer-readable storage media comprising instructions stored thereon that, responsive to execution by a computing device, causes the computing device to implement a global composition system comprising:
a user-mode library having a one or more application programming interfaces that are accessible to a plurality of applications that are executable on the computing device;
a single instance of a composition engine configured to render elements for the plurality of applications to a display device, the elements described in data received from each of the plurality of applications and respective ones of the elements having different render constraints; and
an object database module configured to communicate the data from the one or more application programming interfaces (APIs) to the composition engine.

19. One or more computer-readable storage media as described in claim 18, wherein the object database module is configured to be implemented in a kernel of an operating system that is executed on the computing device.

20. One or more computer-readable storage media as described in claim 18, wherein the elements include a first window that corresponds to a first said application and a second window that corresponds to a second said application.

* * * * *